United States Patent
Santos et al.

[11] Patent Number: 5,441,992
[45] Date of Patent: Aug. 15, 1995

[54] NON-CFC FOAM PRODUCED USING PERFLUOROALKANES

[76] Inventors: Ruben Santos, 1224 Arlington Ave., Sarnia, Ontario, Canada, N7S 3T8; Paul Meunier, Box 20 Beverly Glen R.R. #2, Camlachie, Ontario, Canada, N0N-1E0; Vyacheslav S. Grinshpun, 1277 Daley Ave., Sarnia, Ontario, Canada, N7S 5X3; William Kipp, P.O. Box 235, Courtright, Ontario, Canada, N0N 1H0; Jennifer Willson, M202-1520 Venetian Blvd., Pt. Edward, Ontario, Canada, N7T 7Z8

[21] Appl. No.: 257,406

[22] Filed: Jun. 9, 1994

[51] Int. Cl.⁶ .................................. C08J 9/14
[52] U.S. Cl. ......................... 521/131; 521/98; 521/181
[58] Field of Search .................. 521/98, 131, 181

[56] References Cited

U.S. PATENT DOCUMENTS

| | | |
|---|---|---|
| 4,882,364 | 11/1989 | Kyle et al. |
| 4,972,002 | 11/1990 | Volkert . |
| 5,034,424 | 7/1991 | Wenning et al. |
| 5,145,606 | 9/1992 | Omure et al. |
| 5,149,473 | 9/1992 | LeDuc . |
| 5,154,088 | 10/1992 | Lehnert et al. |
| 5,166,182 | 11/1992 | Blanpied . |
| 5,182,040 | 1/1993 | Bartlett et al. |
| 5,210,106 | 5/1993 | Dams et al. |
| 5,211,873 | 5/1993 | Dams et al. |
| 5,244,928 | 9/1993 | Smith et al. |
| 5,264,462 | 11/1993 | Hodson et al. |
| 5,278,196 | 1/1994 | Robin et al. |
| 5,286,759 | 2/1994 | Smits et al. |
| 5,290,823 | 3/1994 | Weisenheim . |

FOREIGN PATENT DOCUMENTS

| | | |
|---|---|---|
| 2099388 | 1/1994 | Canada . |
| 0439283A1 | 7/1991 | European Pat. Off. |
| 0579321A1 | 1/1994 | European Pat. Off. |
| WO91/10704 | 7/1991 | WIPO . |

*Primary Examiner*—Morton Foelak
*Attorney, Agent, or Firm*—Ted C. Gillespie; Patrick P. Pacella; C. Michael Gegenheimer

[57] ABSTRACT

This invention relates to the production of low density resol foams from resol resins. The foams have a density of 2.0 pounds per cubic foot or less and are produced with a blowing agent of low boiling point HCFCs and perfluoroalkane.

11 Claims, No Drawings

NON-CFC FOAM PRODUCED USING PERFLUOROALKANES

TECHNICAL FIELD

This invention relates to the manufacture of non-CFC resol foams from phenol formaldehyde resins and more specifically to the manufacture of closed cell resol foams which have a very high viscosity.

BACKGROUND ART

The foam industry has been using chlorofluorocarbons (CFC) as blowing agents for producing foams from synthetic resins. Because of environmental concerns, the industry has been looking for blowing agents which have a less damaging effect on the environment. The industry, however, also is concerned with producing foams which have better performance. Accordingly, any blowing agent which is less damaging to the environment, as well as provides product performance would be highly desirable.

DISCLOSURE OF INVENTION

We now have discovered a process for producing a resol foam which meets the environmental concerns, as well as providing a foam which has desirable product performance. Our process includes the steps of:
providing a foaming composition of:
(a) a phenol formaldehyde resol resin having substantially no free formaldehyde and having a water content of 4 to 8% and a viscosity ranging from 5,000 cps to 40,000 cps at 40° C.;
(b) a blowing agent consisting essentially of (i) a low boiling point hydrogenated chlorofluorocarbon (HCFC) or hydrofluorocarbon (HFC) and (ii) a perfluoroalkane wherein the perfluoroalkane comprises 1 to 5 weight percent of total blowing agent weight;
(c) a surfactant; and
(d) catalyst;
mixing the composition to initiate foaming and to produce a resol foam; and
curing the resol foam to a density ranging from 0.5 to 2.0 pounds per cubic foot.

This process allows us to foam phenol formaldehyde resins which have a very high viscosity and cure the foams to a very low density.

DETAILED DESCRIPTION OF THE INVENTION

Preferably, the HCFCs or HFCs have a boiling point below 0° C. Specific examples of these low boiling point blowing agents include 1-chloro-1, 1 odifluoroethane (142$b$), chlorodifluoro-methane (22), 2chloro-1,1,1,2-tetrafluoroethane (124), 1,1 -difluoroethane (152$a$), pentafluoroethane (125)and 1,1,1,2otetrafluoroethane (134$a$).

The blowing agent also includes a perfluoroalkane wherein the perfluoroalkane comprises 1 to 5 weight percent of the total blowing agent weight. Preferably, the perfluoroalkane is represented by the formula:

$$C_nH_xF_y$$

wherein n is an integer ranging from 4 to 20, x is zero or an integer ranging from 2 to 10, and $x+y=2n+2$. Specific examples of the perfluoroalkane include dodecafluoropentane, tetradecafluorohexane and hexadecafluoroheptane.

Preferably the perfluoroalkane comprises 1 to 3 weight percent and more preferably, 1 to 2 weight percent of total blowing agent weight.

The cured resol foam has a density ranging from 0.5 to 2.0 pounds per cubic foot. Preferably the resol foam density ranges from 0.7 to 1.8 pounds per cubic foot. The phenolic resin preferably has a viscosity ranging from 5,000 cps to 40,000 cps at 40° C. Preferably the resol resin has a viscosity ranging from 8,000 cps to 20,000 cps at 40° C.

The basic steps for preparing foams from resol resin are as follows:
(a) preparation of the resol resin;
(b) addition of any modifying agent;
(c) neutralizing the resin;
(d) stripping off water, e.g. by vacuum stripper;
(e) adding the surfactant;
(f) adding a blowing agent;
(g) adding an acid catalyst and allowing the mixture to foam; and
(h) curing the foam.

The foams are prepared from resols which have been made using conventional starting mole ratios of phenol to formaldehyde, in the present case in the range of 1:1 to 1:4.5, preferably 1:1.5 to 2.5. The high mole ratio materials are the basis for resins which are substantially free of phenol and which can be treated with a formaldehyde co-reactant or scavenger, to reduce the initially high free formaldehyde content.

The resin is concentrated to reduce the free water content of the resin. A typical viscosity resin used for manufacturing resol foam has a viscosity in the order of 5,000 to 40,000 cps at 40° C. and a free water content of 4 to 8%. However, during the manufacture of resol foams from high viscosity resins in accordance with the present invention, the resin utilized will preferably have a viscosity in the order of 8,000 to 20,000 cps at 40° C.

We also use a ramping postcure procedure according to the following:
0 to 70 minutes at 75–85° C. followed by
20 to 105 minutes at 90–95° C. followed by
60 to 170 minutes at 100–105 ° C.

The purpose of the ramped postcure cycle is to reduce the cell wall damage that might otherwise occur to the foam if it was postcured under higher initial temperatures, while reducing the postcure time by gradually increasing the curing temperature, and therefore rate of cure, instead of maintaining the temperature at the relatively low initial. The low initial postcure temperature and the ramping cycle ensure that the green foam is not exposed to high temperatures when the foam cell walls are still weak and undercured. The ramping temperature cycle allows the foam cell walls to cure and strengthen at a more controlled rate, with a gradual elimination of the water vapour produced during the curing reaction. The result is a foam that can withstand the increased internal cell pressure and resist cell rupture at higher temperatures. A ramped postcure cycle reduces cell wall damage that would occur under more severe postcure conditions and improves the thermal performance of the foam.

With phaseout of ozone-depleting substances such as CFCs, alternate substances had to be used as blowing agents for foamed plastics. No drop-in substitutes were available that would maintain the foam properties, mechanical and thermal. Typically, the less ozone-depleting alternates were more soluble than CFCs and created a foam with a larger cell size and inferior thermal and mechanical properties. This invention uses perfluorinated alkanes as additives to HCFC blowing agents to improve the properties of resol foams. The perfluoroalkanes (PFA), when added in the low quantities to the blowing agent, result in a foam with smaller cell size, improved thermal performance, improved compressive strength and friability compared to foams made without the PFA additive. Furthermore, the addition of PFA to the foaming system improves the processability of the foam and in some cases the ability to make a lower density product with equivalent or improved properties over the non-PFA containing foam. The following examples demonstrate these results.

EXAMPLE 113 Preparation of Resol

The resol resin used in the production of these foams used a formaldehyde:phenol (F/P) mole ratio of 2.3: 1, using 52% formaldehyde and 99% phenol. The reaction was carried out under basic conditions at elevated temperatures with 50% caustic solution. When the Ostwald viscosity of the resin reached 62cst (measured at 25° C.), the reaction was cooled and neutralized with 50% aqueous aromatic sulphonic acid. Urea was added as a formaldehyde scavenger at a level of 77% by mole of the residual formaldehyde. The resin was passed through a thin film evaporator to reduce the water content from about 30% to 4–8%. An ethylene oxide based nonionic surfactant was then added at 3.5% by weight of the resin. The final viscosity of the resin was 9000–12000 cps (measured at 40° C.).

Example 2—Preparation of a non-CFC Resol Foam

The resol foam was prepared by mixing together the resol resin and surfactant with the blowing agent and acid catalyst using a high shear short residence, rotor/stator continuous mixer. The blowing agent was saturated with nitrogen at 200 psi prior to introduction in the high shear mixer. The foaming catalyst was a blend of resorcinol, diethylene glycol, and a mixture of xylene and toluene sulphonic acids. (See U.S. Pat. Nos. 4,883,824 and 4,945,077). The resol resin, blowing agent, and catalyst were continuously metered to the mixer by means of suitable flow metering devices in the following ratios:

| resin/surfactant | 100 |
|---|---|
| HCFC142b | 7.43 |
| catalyst | 11.15 |

It is important that the pressure inside the mixer be controlled to a range that prevents premature foaming, typically 170 to 250 psig. This pressure range depends on the vapor pressure and boiling point of the blowing agent and on the temperature in the mixer. A blowing agent such as HCFC141b, which has a boiling point of 32° C. does not require the high operating pressures to prevent premature foaming because the vapor pressure is 35 psia (at 60° C.). However, very low boiling blowing agents like HCFC142b and particularly HCFC22 which boil at −9.8° C. and −40.8° C. respectively, require much higher mixer pressures to prevent premature foaming.

The foamable mixture (resin/surfactant, blowing agent, catalyst) exited the mixer through evenly spaced tubes and nozzles to form continuous beads of froth on a moving facer. This resulted in parallel lines of foam which knitted together, as the froth expanded, to form a continuous sheet. The foam sheet then moved through a conveyor oven at approximately 80° C. at a fixed rate to produce a board that was cured enough to handle. The boards were transferred to a postcure oven where additional during took place, using the following postcure cycle:

25 minutes at 75° C. followed by
25 minutes at 85° C. followed by
50 minutes at 90° C. followed by
25 minutes at 95° C. followed by
25 minutes at 100° C. followed by
50 minutes at 105° C.

EXAMPLES 3–8

The preparation of non-CFC resol foams in Examples 3–9 followed the procedure in Example 2. The perfluoroalkane additive used in these examples was dodecafluoropentane ($C_5F_{12}$) sold by 3M as PF-5050 Performance Fluid. In Examples 3, 5, 7 and 9, a pre-weighed quantity of PFA was blown, with nitrogen, into the bottom of an enclosed pressure vessel containing the HCFC. This blowing agent/PFA blend was then saturated with nitrogen to 200 psi. This saturation or sparging process created enough turbulence to mix the blowing agent and PFA together such that no additional mechanical mixing was required. In the examples where mixtures of HCFCs were used, the HCFC blending was done in the same manner as the PFA addition. The preweighted HCFC was blown with nitrogen into a pressure vessel, followed by the PFA additive and then nitrogen saturation.

RESULTS

The non-CFC resol foam properties for Examples 2–8 follow:

The effect of PFA on HCFC142b-blown resol foams is shown in Examples 2 and 3. Even with a density reduction of 50% in the PFA-containing foam, the thermal conductivity improved. To quantify the effect of blowing agent and formulation changes on foam brittleness, friability is measured according to the ASTM method C421 and is reported as weight loss as a percent of the whole. The objective is to produce a foam with a low friability. The addition of PFA to HCFC142b reduced the friability by 13% which is significant given that a density reduction alone can cause an increase in friability. A cell size reduction of 20% was measured by scanning electron microscopy. This cell size reduction explains the improved thermal conductivity, both initial and after conditioning 28 days at 100° C., and improved mechanical properties of the foam.

Example 3 shows the effect of a ramped postcure cycle as described in example 2 versus a more severe postcure where the foam is exposed to 85° C. for 13.5 minutes followed by 105° C. for 136.5 minutes. Under the more severe postcure conditions (Example 3b), foam properties are inferior to foam made with the ramped postcure cycle (Example 3a). There is an increase in both initial and 100° C. conditioned thermal conductivities as well as an increase in foam friability.

Example 4 demonstrates the ability of this technology to produce a low density foam at 0.092 pcf with good initial thermal properties.

In Examples 5 and 6 the blowing agent was a blend of HCFC142b and HCFC22. Because HCFC142b is flammable (flammability limits 6.7–14.9% by volume in air), it was blended with the non-flammable HCFC22 to create a non-flammable blend. Also of consideration when choosing the appropriate ratio of HCFC142b to HCFC22 was the very low boiling point, and hence high vapor pressure of HCFC22. Too much HCFC22 would make processing and foaming difficult to control. The 60/40 (wt/wt) blend of HCFC142b/HCFC22 provided a non-flammable blend that could be processed without difficulty. Even with a slight density reduction (from 1.91 to 1.84 pcf), thermal properties improved with the addition of PFA. The addition of PFA to HCFC142b/HCFC22 blend reduced the friability of the foam by 30%. A cell size reduction of 50% was measured.

Another non-CFC blend that was investigated was a blend of HCFC141b, HCFC142b and HCFC22. The 35/35/30 by weight blend of HCFC141b, HCFC142b and HCFC22 was chosen because it was non-flammable and provided a combination that balanced the boiling points, flammability and solvency of the three individual blowing agents. In Examples 7 and 8 the densities were similar but a reduction in cell size by 14% and friability by 25 % accompanies the PFA-containing HCFC141b/HCFC142b/HCFC22 resol foam. In addition, an improvement of 39% was measured in the compressive strength of this foam.

(ii) a perfluoroalkane wherein the perfluoroalkane comprises 1 to 5 weight percent of total blowing agent weight;
(c) a surfactant; and
(d) catalyst
mixing the composition to initiate foaming and to produce a phenolic foam; and
curing the phenolic foam to a density ranging from 0.5 to 2.0 pounds per cubic foot.

2. A process according to claim 1, wherein the perfluoroalkane comprises 1 to 3 weight percent of total blowing agent weight.

3. A process according to claim 1, wherein the perfluoroalkane comprises 1 to 2 weight percent of total blowing agent weight.

4. A process according to claim 1, wherein phenolic foam density ranges from 0.7 to 1.8 pounds per cubic foot.

5. A process according to claim 1, wherein the perfluoroalkane is represented by the formula:

$$C_nH_xF_y$$

wherein n is an integer ranging from 4 to 20, x is zero or an integer ranging from 2 to 10, and $x+y=2n+2$.

6. A process according to claim 1, wherein the HCFC in the blowing agent is 1-chloro1,1-difluoroethane, chlorodifluoromethane or a mixture thereof.

7. A process according to claim 6, wherein the perfluoroalkane in the blowing agent is dodecafluoropentane.

8. A process according to claim 1, wherein the phenol resin has viscosity ranging from 8,000 cps to 20,000 cps at 40° C.

9. A process according to claim 1, wherein the HCFC has a boiling point below 0° C.

TABLE 1

RESOL FOAM FORMULATIONS

| Examples | Blowing Agent HCFC | Wt/Wt Ratio | PFA Added (Wt % of BA) | Blowing Agent (PPH Resin) [1] | Catalyst (PPH Resin) |
|---|---|---|---|---|---|
| 2 | 142b | — | — | 7.43 | 11.15 |
| 3 | 142b | — | 2% | 15.43 | 17.95 |
| 4 | 142b | — | 2% | 21.30 | 19.15 |
| 5 | 142b/22 | 60/40 | — | 19.77 | 17.47 |
| 6 | 142b/22 | 60/40 | 3% | 22.40 | 18.64 |
| 7 | 141b/142b/22 | 35/35/30 | — | 19.24 | 18.42 |
| 8 | 141b/142b/22 | 35/35/30 | 2% | 20.06 | 18.06 |

Note:
[1] blowing agent quantity, measured as parts per hundred parts resin, includes PFA.

TABLE 2

FOAM PROPERTIES

| Example | Density (pcf) | Thermal Conductivity (BTU.In/ft².hr.F.) | | Compressive Strength[2](kPa) | Friability[3] (% wt. loss) | Cell Size (Microns) |
|---|---|---|---|---|---|---|
| 2 | 2.50 | 0.130 | 0.136 | 201 | 34 | 130 |
| 3 | 1.91 | [4]0.127 | [4]0.145 | — | 44 | 150 |
| 3a | 1.68 | 0.121 | 0.129 | 177 | 30 | 110 |
| 3b | 1.78 | 0.149 | 0.189 | — | 38 | — |
| 4 | 0.92 | 0.138 | — | — | 64 | — |
| 7 | 1.60 | 0.124 | 0.136 | 127 | 44 | 140 |
| 8 | 1.64 | 0.124 | 0.128 | 176 | 35 | 123 |

Notes:
[1] CGSB 51.25 M87 requires conditioning the sample at 100° C. for 28 days prior to measuring thermal conductivity.
[2] at 10% deformation
[3] tested according to ASTM C421
[4] measured on 1" core samples

We claim:
1. A process for producing a closed cell phenolic foam comprising the steps of:
providing a foaming composition of
(a) a phenol formaldehyde resole resin having substantially no free formaldehyde and having a water content of 4 to 8% and a viscosity ranging from 5,000 cps to 40,000 cps at 40° C.;
(b) a blowing agent consisting essentially of (i) a low boiling point hydrogenated chlorofluorocarbon (HCFC) or hydrogenated fluorocarbon (HFC) and

10. A process according to claim 1, which uses a ramping postcure procedure according to the following schedule:

0 to 70 minutes at 75°–85° C. followed by 20 to 105 minutes at 90°–95° C. followed by 60 to 170 minutes at 100°–105° C.

11. A process according to claim 1 where the postcure cycle 25 minutes at 75° C. followed by 25 minutes at 85° C. followed by 50 minutes at 90° C. followed by 25 minutes at 95° C. followed by 25 minutes at 100° C. followed by 50 minutes at 105° C.

* * * * *